United States Patent [19]

Suenaga et al.

[11] Patent Number: 5,060,845
[45] Date of Patent: Oct. 29, 1991

[54] METHOD FOR MANUFACTURE TITANIUM CLAD STEEL PLATE

[75] Inventors: Hiroyoshi Suenaga; Misao Ishikawa; Kuninori Minakawa, all of Kawasaki, Japan

[73] Assignee: NKK Corporation, Tokyo, Japan

[21] Appl. No.: 532,911

[22] Filed: Jun. 4, 1990

[30] Foreign Application Priority Data

Jul. 4, 1989 [JP] Japan .................................. 1-171173

[51] Int. Cl.$^5$ ...................... B23K 35/30; B23K 11/16; B32B 15/01
[52] U.S. Cl. .................................. 228/186; 228/235; 228/242; 228/190; 228/194; 228/263.13; 428/660; 428/679
[58] Field of Search ............... 228/186, 135, 190, 194, 228/235, 263.16, 263.15; 428/660

[56] References Cited

U.S. PATENT DOCUMENTS

| 3,015,885 | 1/1962 | McEven et al. | 428/660 |
| 3,121,949 | 2/1964 | Wright | 228/186 |
| 3,125,805 | 3/1964 | Horigan, Jr. | 428/660 |
| 4,023,936 | 5/1977 | Morse et al. | 228/190 |
| 4,612,259 | 9/1986 | Ueda | 228/190 |
| 4,694,985 | 9/1987 | Ouchi et al. | 228/235 |
| 4,806,438 | 2/1989 | Hinotani | 228/235 |
| 4,837,242 | 6/1989 | Murayama et al. | 428/660 |

FOREIGN PATENT DOCUMENTS

| 0060083 | 9/1982 | European Pat. Off. | 228/190 |
| 56-1286 | 1/1981 | Japan | 228/194 |
| 56-1287 | 1/1981 | Japan | 228/263.16 |
| 56-74390 | 6/1981 | Japan | 228/194 |
| 60-124483 | 7/1985 | Japan . | |
| 567581 | 8/1977 | U.S.S.R. | 228/235 |

OTHER PUBLICATIONS

"Metal" (a journal), vol. 32, No. 20 (10/62).

Primary Examiner—Richard K. Seidel
Assistant Examiner—Jeanne M. Elpel
Attorney, Agent, or Firm—Frishauf, Holtz, Goodman & Woodward

[57] ABSTRACT

A method for manufacturing titanium clad steel plate by forming a slab assembly having an alloy steel substrate, a titanium metal or alloy cladding on said substrate and a Ni-Cr alloy foil or film having opposed surfaces between said alloy steel and said cladding. The Ni-Cr alloy foil or film has one surface in surface contact with the cladding and the opposed surface in surface contact with the alloy steel substrate. The Ni-Cr alloy contains 32.5 to 40 wt. % Cr and 55 to 65 wt. % Ni. The slab assembly is heated at a temperature of 850° to 1010° C. The heated slab assembly is hot rolled with a reduction ratio of 30% or more to form the titanium clad steel plate.

14 Claims, 1 Drawing Sheet

METHOD FOR MANUFACTURE TITANIUM CLAD STEEL PLATE

BACKGROUND OF THE INVENTION

1. Field of the Invention

The present invention relates to a method for manufacturing titanium or titanium alloy clad steel plate.

2. Description of the Prior Art

A clad metal plate is manufactured by laminating two metal plates or more and joining the laminated metal plates to each other. This clad metal plate is excellent in corrosion resistance, wear resistance and heat resistance, and has a high strength. Therefore, the clad metal plate is widely used as an inexpensive material.

As the methods for manufacturing clad metal plate, an explosion bonding process, a surfacing process and a rolling process are pointed out. The rolling process, which can manufacture the clad metal plate of large area with high efficiency and at low cost, is most generally used.

In the rolling process, surfaces of cladding metals and a base metal, at which the cladding metals are bonded to the base metal, are cleaned, and the cladding metals and the base metal are laminated and hot-rolled or warm-rolled, by which the cladding metals are metallurgically bonded to the base metal. In this method, stainless steel as the cladding metal and carbon steel, low alloy steel and high alloy steel as the base metals are used.

However, when the rolling process is applied to the manufacture of a titanium clad steel plate, wherein titanium or titanium alloy is used as the cladding metal, it is extremely difficult to obtain a good joining property because there are problems as shown below.

When titanium or titanium alloy and alloy steel are laminated, uniformly heated at a predetermined temperature, and hot-rolled or warm-rolled, a brittle Ti-Fe intermetallic compound is generated on cladding surfaces by interdiffusion of titanium and iron. This brittle Ti-Fe intermetallic compound greatly decreases the shearing strength of the cladding surfaces.

As a method for preventing the intermetallic compound from being generated, a method, wherein a thin film or a foil of Mo, Nb or V which does not generate the intermetallic compound with titanium is employed as an insert material, has been proposed. The insert material is inserted between the base material and the cladding metal.

There are, however, two problems in the method for using the film or the foil of Mo, Nb or V. The first problem is that the manufacturing cost increases greatly because Mo, Nb and V are very expensive. The second problem is that since the insert material lacks ductility, the insert material breaks during rolling. Due to those problems, this method is not put to practical use.

Two sorts of insert materials which are manufactured on an experimental basis are pointed out. Plating and foil of Cu, Ni or Cr are disclosed in a journal "Metal" vol. 32, No. 20. A Japanese Patent Publication Laid Open No. 124483/85 discloses foil of stainless steel of ferrite and martensite. However, sufficient cladding strength cannot be obtained by those insert materials.

When the explosion bonding process is used instead of the rolling process, the Ti-Fe intermetallic compound is not generated since the cladding metal is bonded to the base material not metallurgically, but mechanically. In this method, a comparatively good cladding property can be obtained. However, since the explosion bonding process is limited to cladding of the cladding metals to the base metal of large area, it is difficult to use this process widely.

SUMMARY OF THE INVENTION

It is an object of the present invention to provide a method for manufacturing titanium clad steel plates excellent in cladding property.

To attain the aforementioned object, the present invention provides a method for manufacturing titanium clad steel plate comprising the steps of:

inserting Ni-Cr alloy material containing 32.5 to 40 wt. % Cr and 55 to 65 wt. % Ni between alloy steel material and titanium material, a slab assembly having alloy steel material, titanium material and Ni-Cr alloy material inserted between alloy steel material and titanium material being formed;

heating said slab assembly at a temperature of 850 to 1010° C.; and hot-rolling said heated slab assembly with a reduction ratio of 30% or more.

The above objects and other objects and advantages of the present invention will become apparent from the detailed description which follows, taken in conjunction with the appended drawings.

DESCRIPTION OF THE PREFERRED EMBODIMENT

Figure 1:
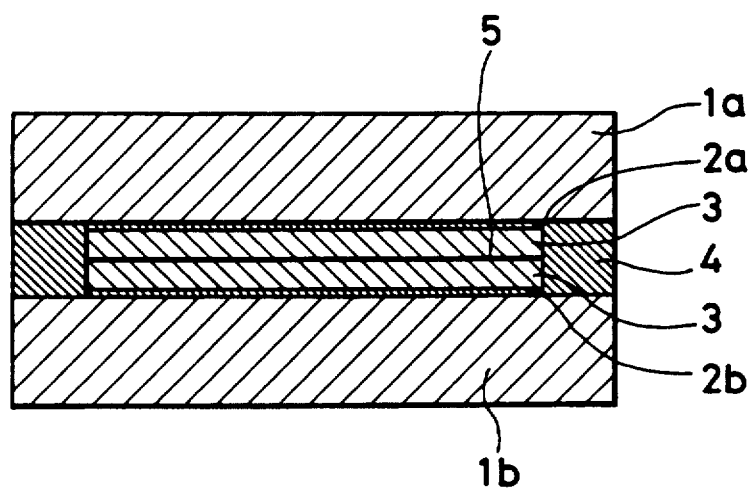
FIG. 1 is a sectional view illustrating a slab assembly of titanium clad steel plate of the present invention.

When the titanium clad steel plate is manufactured, the brittle Ti-Fe intermetallic compound is generated on cladding surface of titanium and alloy steel due to the interdiffusion of atoms of titanium and iron. It is important in formation of good rolling cladding surfaces to limit the generation of the brittle Ti-Fe intermetallic compound.

The present inventors selected various sorts of insert materials to be inserted into between the cladding materials of titanium or titanium alloy and the base material of alloy steel, and manufactured titanium clad steel plate by hot-rolling with the use of said insert materials. The cladding property of the titanium clad steel plate obtained was analyzed. As a result, the present inventors found that the good cladding property could be obtained by selecting the insert materials, the heating temperature and the reduction ratio during the hot rolling.

That is, in the present invention, titanium clad steel plate excellent in the cladding strength is manufactured by inserting Ni-Cr alloy between the cladding metals of titanium or titanium alloy and the base metal of alloy steel and hot-rolling the cladding metals and the base alloy with the Ni-Cr alloy between them at a temperature of 850° to 1010° C. with the reduction ratio of 30% or more.

The insert material can be any of a thin sheet, a foil, a plating film formed on a base material, or a flame coating film formed on a base material. Carbon steel, low alloy steel and various stainless steels are generically referred to as alloy steel. The alloy composition of titanium alloy is specifically not limited.

FIG. 1 is a sectional view illustrating a slab assembly of titanium clad steel plate of the present invention. A slab assembly is made by laminating one obtained by inserting an insert material 2a between a base metal 1a and a cladding metal 3 and the other obtained by inserting an insert material 2b between a base metal 1b and a cladding metal 3.

Spacer material 4 is incorporated into the outer edge spaces between the base material 1a and 1b, between which the insert material 2a, the cladding metal 3 and the insert material 2b are put. Surfaces, at which the base materials 1a and 1b contact the spacer 4, are tightly sealed by welding. Air remaining in voids inside the slab assembly is exhausted by a vacuum pump. After the slab has been temporarily assembled, the outer edge spaces can be sealed by an electron beam welding in a vacuum chamber. Since the air remaining in the voids inside the slab assembly is removed by means of the vacuum pump, or the outer edge spaces are welded in the vacuum chamber, the generation of titanium oxides or nitride between the insert materials 2a or 2b and the cladding metal can be suppressed.

The insert material is Ni-Cr alloy. Ni-Cr alloy containing 32.5 to 40 wt. % Cr and 55 to 65 wt. % Ni is preferred.

When Cr content is below 32.5 wt. %, a brittle Ti (Ni, Cr)$_3$ is formed at the boundary between the cladding metal 3 of titanium or titanium alloy and the insert materials 2a or 2b, which decreases the cladding strength. When the Cr content exceeds 40 wt. %, a brittle $\delta$-phase is formed at the boundary of the base material of alloy steel and the insert materials 2a or 2b, which decreases the cladding strength. The Cr content of 32.5 to 35 wt. % is preferred.

When Ni content is below 55 wt. %, a brittle TiCr$_2$ is formed at the boundary of the cladding material of titanium or titanium alloy and the insert materials 2a or 2b, which decreases the cladding strength. When the Ni content exceeds 65 wt. %, the brittle Ti (Ni,Cr)$_3$ is formed as in the case where the Cr content is below 32.5 wt. %, which decreases the cladding strength.

The content of Ni and Cr is important for the insert materials. Even though the insert materials contain impurities such as Fe of less than 10 wt. %, the insert materials do not lose their effect.

The temperature for heating the slab assembly during the hot rolling is desired to be from 850° to 1010° C. The reduction ratio is desired to be 30% or more. When the heating temperature exceeds 1010° C., although the content of the insert materials 2a and 2b is limited to the aforementioned range, the brittle Ti (Ni,Cr)$_3$ is formed at the boundary of the cladding materials 3 of titanium or titanium alloy and the insert materials 2a or 2b during the rolling and during the successive cooling after the rolling, which decreases the cladding strength. When the heating temperature is below 850° C. residual stress is generated in the finishing rolled plate by the hot rolling, which decreases the cladding strength.

When the reduction ratio is below 30%, the plastic deformation necessary for cladding cannot be obtained without depending on the content of the insert materials 2a or 2b. That is, the plastic deformation cannot be obtained at the boundary of the cladding materials of titanium or titanium alloy and the insert materials 2a or 2b and at the boundary of the insert materials 2a or 2b and the alloy steel as the base metal 1. Accordingly, a sufficient cladding strength cannot be obtained. The reduction ratio has no specific upper limit. However, the range of 30 to 80% is preferred.

EXAMPLE

An example of the present invention will now be described with specific reference to the appended drawings. In the drawings, reference numerals 1a and 1b denote base metals, 2a and 2b insert materials, 3 a cladding metal, 4 a steel, and 5 a separating compound of alumina. The base metals 1a and 1b each were of steel, 50 mm in thickness, 200 mm in breadth and 250 mm in length. Cladding surfaces were subjected to milling. A pure titanium plate and an alloy plate of Ti-6% Al-4% V were used as the cladding metals 3. These plates each were of 10 mm in thickness, 140 mm in breadth and 190 mm in length. Cladding surfaces were subjected to milling.

The influence of the Cr content and the Ni content on the joining property was studied by varying the Cr content in the range of 10 to 60 wt. % and the Ni content in the range of 30 to 80 wt. %. The thicknesses of the insert materials 2a and 2b each were 0.1 mm. As the insert materials 2a and 2b, a foil, a plating film formed on the surface or a flame coating film formed on the surface of the base metal were used. A slab assembly was constituted by interposing the insert materials 2a and 2b between the base metals 1a, 1b and the cladding materials 3. The slab assembly constituted in this way was of 120 mm in thickness. Air inside the slab was exhausted and the pressure inside the slab was reduced to $10^{-1}$ Torr.

After the slab assembly had been heated at a temperature of 800° to 1050° C., the slab assembly was hot-rolled to be of a predetermined thickness in the range of 24 to 100 mm. After the hot rolling of the slab assembly, the slab assembly was cooled, and clad steel plates were made by separating the clad steel 1a-2a-3 from the clad steel 1b-2b-3.

To examine the joining property of the clad steel plates, test pieces were taken from the aforementioned hot-rolled steel plates, and the shearing strength of the test pieces were examined. The manufacturing conditions and the joining property are shown in Table 1. The shearing strength of the test pieces in Test Nos. 1 to 10 were from 25.6 to 29.9 kgf/mm$^2$. As against those, the shearing strength of the control test pieces were only from 4.2 to 13.9 kgf/mm$^2$. In the Example of the present invention, a titanium clad steel plate having a shearing strength 25 kgf/mm$^2$ or more was manufactured.

TABLE 1

Manufacturing conditions and joining property

| Nos. | Composition of Insert Materials (wt. %) | | | Shapes of Insert Materials | Heating Temperature (°C.) | Reduction Ratio (%) | Shearing Strength (kgf/mm$^2$) |
|---|---|---|---|---|---|---|---|
| | Ni | Cr | #Total of Others | | | | |
| Examples of the Present Invention | | | | | | | |
| 1 | 65 | 32.5 | 2.5 | Foil | 950 | 80 | 29.5 |
| 2 | 60 | 32.5 | 7.5 | Foil | 950 | 80 | 29.9 |
| 3 | 60 | 35 | 5 | Foil | 950 | 80 | 28.1 |
| 4 | 55 | 35 | 10 | Foil | 950 | 80 | 29.0 |
| 5 | 60 | 35 | 5 | Flame Coating | 950 | 80 | 27.6 |
| 6 | 60 | 35 | 5 | Plating | 950 | 80 | 28.3 |
| 7 | 60 | 35 | 5 | Foil | 1010 | 80 | 25.6 |
| 8 | 60 | 35 | 5 | Foil | 850 | 80 | 27.1 |
| 9 | 60 | 35 | 5 | Foil | 950 | 30 | 25.9 |
| 10 | 60 | 35 | 5 | Foil | 950 | 50 | 28.6 |
| Controls | | | | | | | |
| 11 | 80 | 10 | 10 | Foil | 950 | 80 | 7.1 |

TABLE 1-continued

Manufacturing conditions and joining property

| Nos. | Composition of Insert Materials (wt. %) | | | Shapes of Insert Materials | Heating Temperature (°C.) | Reduction Ratio (%) | Shearing Strength (kgf/mm²) |
| --- | --- | --- | --- | --- | --- | --- | --- |
| | Ni | Cr | #Total of Others | | | | |
| 12 | 70 | 20 | 10 | Foil | 950 | 80 | 8.4 |
| 13 | 50 | 40 | 10 | Foil | 950 | 80 | 9.1 |
| 14 | 30 | 60 | 10 | Foil | 950 | 80 | 6.5 |
| 15 | 60 | 35 | 5 | Foil | 1020 | 80 | 11.3 |
| 16 | 60 | 35 | 5 | Foil | 825 | 80 | 13.9 |
| 17 | 60 | 35 | 5 | Foil | 950 | 25 | 4.2 |
| 18 | Low Carbon Steel Containing 0.005% C | | | Foil | 950 | 80 | 11.5 |

Fe and inevitable impurities

What is claimed is:

1. A method for manufacturing titanium clad steel plate comprising forming a slab assembly comprising an alloy steel substrate, a titanium metal or alloy cladding on said substrate and a Ni-Cr alloy foil or film having opposed surfaces between said alloy steel and said titanium cladding; said Ni-Cr alloy foil or film having one surface in surface contact with said titanium cladding and the opposed surface in surface contact with said alloy steel substrate, and said Ni-Cr alloy comprising 32.5 to 40 wt. % Cr and 55 to 65 wt. % Ni;

heating said slab assembly at a temperature of 850 to 1010° C.; and hot-rolling said heated slab assembly with a reduction ratio of 30% or more to form said titanium clad steel plate.

2. The method of claim 1, wherein said Ni-Cr alloy material contains 32.5 to 35 wt. % Cr.

3. The method of claim 2, wherein said reduction ratio is from 30 to 80%.

4. The method of claim 3, wherein said alloy steel is a carbon steel, a low alloy steel or a stainless steel.

5. The method of claim 4, wherein said slab assembly is heated at a temperature of about 950° C.

6. The method of claim 5, wherein said titanium cladding is a titanium alloy and wherein said Ni-Cr alloy consists essentially of 65% wt. % Ni, 32.5 wt. % Cr and 2.5 wt. % Fe.

7. The method of claim 5, wherein said titanium cladding is a titanium alloy and wherein said Ni-Cr alloy consists essentially of 60% wt. % Ni, 32.5 wt. % Cr and 7.5 wt. % Fe.

8. The method of claim 5, wherein said titanium cladding is a titanium alloy and wherein said Ni-Cr alloy consists essentially of 60% wt. % Ni, 35 wt. % Cr and 5 wt. % Fe.

9. The method of claim 5, wherein said titanium cladding is a titanium alloy and wherein said Ni-Cr alloy consists essentially of 55% wt. % Ni, 35 wt. % Cr and 10 wt. % Fe.

10. The method of claim 1, wherein said reduction ratio is from 30 to 80%.

11. The method of claim 1, wherein said titanium metal or alloy is titanium metal.

12. The method of claim 1, wherein said titanium metal or alloy is a titanium alloy.

13. The method of claim 1, wherein said alloy steel is a carbon steel, a low alloy steel or a stainless steel.

14. The method of claim 1, wherein said foil or film is a foil or a plated film or a flame coated film.

* * * * *

UNITED STATES PATENT AND TRADEMARK OFFICE
CERTIFICATE OF CORRECTION

PATENT NO. : 5,060,845
DATED : October 29, 1991
INVENTOR(S) : Hiroyoshi Suenaga, et al It is certified that error appears in the above-identified patent and that said Letters Patent is hereby corrected as shown below:

On the title page, and column 1, line 2,
title of the patent, replace "MANUFACTURE" with --MANUFACTURING--.

Title Page, No. [56], U.S. PATENT DOCUMENTS, last patent listed, replace "4,837,242" with --4,839,242--.

Column 4, line 7, after "steel" insert --spacer--.

Signed and Sealed this

Fourteenth Day of March, 1995

Attest:

BRUCE LEHMAN

*Attesting Officer*     *Commissioner of Patents and Trademarks*